United States Patent
Konishi

(10) Patent No.: US 9,978,138 B2
(45) Date of Patent: May 22, 2018

(54) IMAGE COMPARISON DEVICE, IMAGE SENSOR, PROCESSING SYSTEM, AND IMAGE COMPARISON METHOD

(71) Applicant: OMRON Corporation, Kyoto-shi, Kyoto (JP)

(72) Inventor: Yoshinori Konishi, Seika-cho (JP)

(73) Assignee: OMRON Corporation, Kyoto-shi (JP)

(*) Notice: Subject to any disclaimer, the term of this patent is extended or adjusted under 35 U.S.C. 154(b) by 0 days. days.

(21) Appl. No.: 15/110,116

(22) PCT Filed: Dec. 26, 2014

(86) PCT No.: PCT/JP2014/084644
§ 371 (c)(1),
(2) Date: Jul. 7, 2016

(87) PCT Pub. No.: WO2015/107859
PCT Pub. Date: Jul. 23, 2015

(65) Prior Publication Data
US 2016/0328834 A1    Nov. 10, 2016

(30) Foreign Application Priority Data
Jan. 15, 2014 (JP) ................. 2014-005089

(51) Int. Cl.
*G06K 9/00* (2006.01)
*G06T 7/00* (2017.01)
(Continued)

(52) U.S. Cl.
CPC ............ *G06T 7/001* (2013.01); *G06K 9/4609* (2013.01); *G06K 9/6203* (2013.01);
(Continued)

(58) Field of Classification Search
CPC .................. G06T 7/001; G06T 1/0007; G06T 2207/30164; G06K 9/4609; G06K 9/6203; H04N 5/369; H04N 2201/0089
(Continued)

(56) References Cited

U.S. PATENT DOCUMENTS

| 5,974,163 A | 10/1999 | Kamei |
| 6,868,175 B1 | 3/2005 | Yamamoto et al. |

(Continued)

FOREIGN PATENT DOCUMENTS

| CN | 1440543 A | 9/2003 |
| CN | 102739911 A | 10/2012 |

(Continued)

OTHER PUBLICATIONS

The European search report dated Jul. 18, 2017.
(Continued)

*Primary Examiner* — Daniel Mariam
(74) *Attorney, Agent, or Firm* — Metrolexis Law Group, PLLC

(57) ABSTRACT

An image comparison device includes: a storage in which a model image is stored, the model image including a position of a feature point of a comparison object and a luminance gradient direction at the position of the feature point; a feature amount acquisition unit configured to acquire the position of the feature point and the luminance gradient direction at the position of the feature point from an input image; and an image comparison unit configured to compare the model image and the input image. The image comparison unit performs image comparison by providing an allowable range in both the position of the feature point and the luminance gradient direction at the position of the feature point position.

15 Claims, 10 Drawing Sheets

(51) Int. Cl.
    *G06K 9/46*         (2006.01)
    *G06K 9/62*         (2006.01)
    *G06T 1/00*          (2006.01)
    *H04N 5/369*       (2011.01)

(52) U.S. Cl.
    CPC ........... *G06T 1/0007* (2013.01); *H04N 5/369* (2013.01); *G06T 2207/30164* (2013.01); *H04N 2201/0089* (2013.01)

(58) Field of Classification Search
    USPC ........................................ 382/152, 209, 218
    See application file for complete search history.

(56) References Cited

U.S. PATENT DOCUMENTS

| | | |
|---|---|---|
| 7,016,539 B1 | 3/2006 | Silver et al. |
| 7,024,042 B2 | 4/2006 | Hotta |
| 7,167,583 B1* | 1/2007 | Lipson ................ G06K 9/00 361/720 |
| 7,302,111 B2* | 11/2007 | Olsson ................ G03F 1/76 382/190 |
| 9,036,896 B2* | 5/2015 | Touya ................ G01N 21/9503 382/141 |
| 2008/0292192 A1 | 11/2008 | Seki |
| 2010/0034484 A1 | 2/2010 | Kido |
| 2010/0284577 A1 | 11/2010 | Hua et al. |
| 2011/0001607 A1 | 1/2011 | Kamakura |
| 2012/0257822 A1 | 10/2012 | Guo et al. |
| 2015/0355105 A1* | 12/2015 | Yamashita ......... G01N 21/9501 348/131 |

FOREIGN PATENT DOCUMENTS

| | | |
|---|---|---|
| CN | 103065135 A | 4/2013 |
| JP | H07-249119 A | 9/1995 |
| JP | H09-161054 A | 6/1997 |
| JP | 2003-036443 A | 2/2003 |
| JP | 2007-004823 A | 1/2007 |
| JP | 2008-129743 A | 6/2008 |
| JP | 2008-286725 A | 11/2008 |
| JP | 2010-67247 A | 3/2010 |
| JP | 2011-13912 A | 1/2011 |
| JP | 4867601 B2 | 2/2012 |

OTHER PUBLICATIONS

The Chinese Office Action (CNOA) dated Feb. 24, 2018 in a counterpart Chinese patent application.
The Japanese Office Action (JPOA) dated Mar. 6, 2018 in a counterpart Japanese patent application.

* cited by examiner

FIG. 8
(a) Model image
(b) Narrowed
| Position 0, Direction 0 | Position 0, Direction 3 | Position 3, Direction 0 |
|---|---|---|
| 65 | 73 | 93 |
(c) Cracked
| Position 0, Direction 0 | Position 3, Direction 0 | Position 1, Direction 4 |
|---|---|---|
| 63 | 63 | 99 |
(d) Another
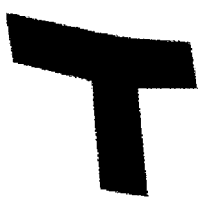
| Position 0, Direction 0 | Position 3, Direction 0 | Position 2, Direction 3 |
|---|---|---|
| 48 | 68 | 87 |

FIG. 9
(a)
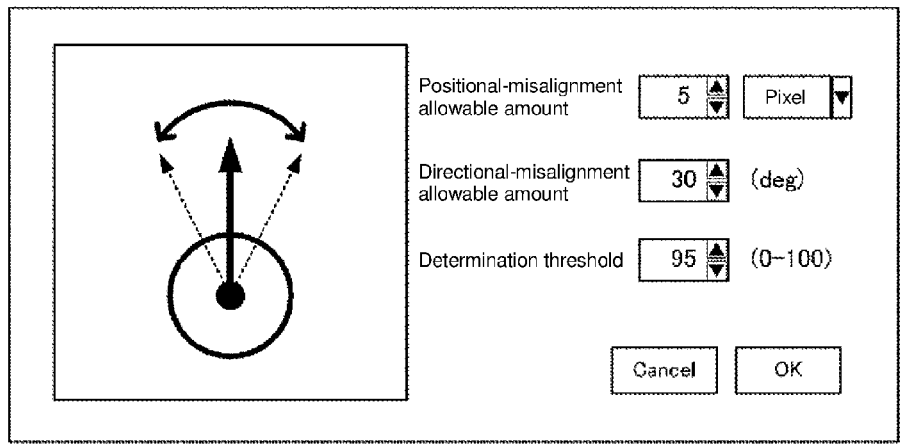
(b)
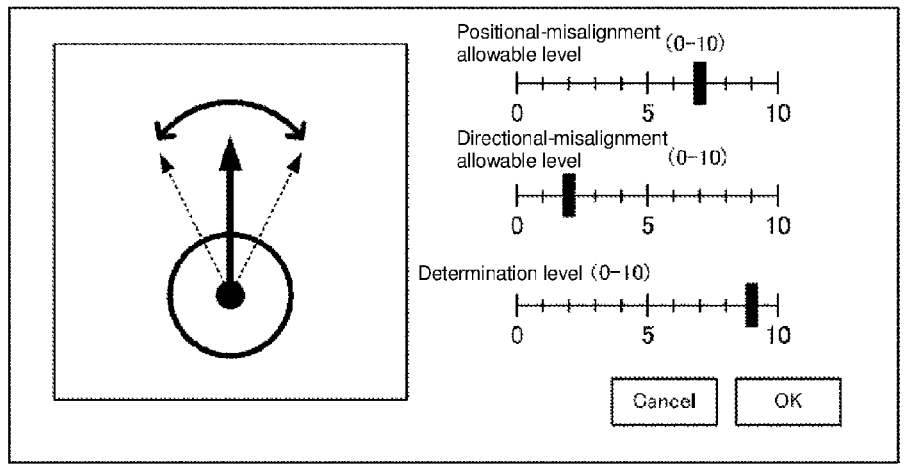

(a)

(b)

| Deformation pattern | Allowable level | | | | | | | | | | |
|---|---|---|---|---|---|---|---|---|---|---|---|
| | 0 | 1 | 2 | 3 | 4 | 5 | 6 | 7 | 8 | 9 | 10 |
| Narrowed | 0 | 1 | 1 | 2 | 4 | 6 | 10 | 15 | 20 | 25 | 30 |
| | 0 | 0 | 5 | 5 | 5 | 10 | 10 | 10 | 20 | 20 | 30 |
| Crack | 0 | 0 | 0 | 1 | 1 | 2 | 2 | 4 | 4 | 6 | 10 |
| | 0 | 5 | 10 | 20 | 30 | 40 | 50 | 60 | 70 | 80 | 90 |
| Others | 0 | 1 | 3 | 3 | 6 | 6 | 10 | 10 | 20 | 25 | 30 |
| | 0 | 5 | 5 | 10 | 10 | 20 | 20 | 30 | 30 | 40 | 50 |

Upper stage: positional-misalignment allowable amount (pixels)
Lower stage: directional-misalignment allowable amount (deg)

IMAGE COMPARISON DEVICE, IMAGE SENSOR, PROCESSING SYSTEM, AND IMAGE COMPARISON METHOD

TECHNICAL FIELD

The present invention relates to a technology of comparing images by template matching.

BACKGROUND ART

In an FA (Factory Automation) field, a sensor device called an image sensor (visual sensor) is widely used in order to measure and monitor a measurement object (hereinafter referred to as a "workpiece") flowing in a line. The image sensor is constructed with a camera and an image processing device, and has a function of extracting and measuring necessary information by detecting the workpiece in the image through matching processing (template matching) with a previously-registered teacher object (hereinafter referred to as a "model" or a "pattern"). Output of the image sensor can be used in various applications such as identification, inspection, and sorting of the workpiece.

There are many needs to detect an object, such as a bag-packaged material or vegetable, a handwritten character, and a human body, the shape of which changes according to a situation or varies among individuals, from the image. A technology of detecting the object (hereinafter referred to as a "variable-shape object") the shape of which changes is currently studied, and "distance transform" and "elastic matching" can be cited as a main technology.

The distance transform is a technology of obtaining a shortest distance from edges of pixels in the image and performing matching based on the shortest distance (Patent Document 1). In the distance transform, the matching can be performed with an allowance of an edge position coordinate between a model image and an input image.

The elastic matching is a technology of performing the matching by calculating a degree of similarity based on a correspondence (mapping function) between feature points of the model image and input image (Patent Documents 2 and 3). In the elastic matching, the matching can be performed with the allowance of the edge position coordinate between the model image and the input image.

PRIOR ART DOCUMENTS

Patent Documents

Patent Document 1: Japanese Unexamined Patent Publication No. 2008-286725
Patent Document 2: US Patent Application No. 2010/0284577
Patent Document 3: U.S. Pat. No. 7,024,042

SUMMARY OF THE INVENTION

Problems to be Solved by the Invention

In the distance transform, although the edge position coordinate has the allowance, a restriction cannot be provided with respect to how each edge point is deformed, but the comparison is successfully performed when an edge point falls within an allowable range in the input image. Accordingly, false matching is easily generated when many edges exist in a background. In order to improve accuracy of the matching, it is desirable to provide a finely allowable scale with respect to the shape change.

In the elastic matching, because of necessity of strict correspondence between the feature points, the elastic matching is applicable only to the object, such as a face and a character, in which the feature point can clearly be extracted. Additionally, only the comparison can be performed using a positional relationship in each portion, but the matching is not performed in consideration of the detailed shape change.

An object of the present invention is to provide a technology of being able to finely specify an allowable shape change to compare the variable-shape objects.

Means for Solving the Problem

In a configuration of the present invention, shape matching is performed while the allowable range is provided in both a position of the feature point and a luminance gradient direction at the feature point.

An image comparison device according to a first aspect of the present invention includes: a storage in which a model image is stored, the model image including a position of a feature point of a comparison object and a luminance gradient direction at the position of the feature point; a feature amount acquisition unit configured to acquire the position of the feature point and the luminance gradient direction at the position of the feature point from an input image; and an image comparison unit configured to compare the model image and the input image. At this point, the image comparison unit performs image comparison by providing an allowable range in both the position of the feature point and the luminance gradient direction at the position of the feature point position. The image comparison unit may perform the image comparison by determining, with respect to the feature point (a model feature point) included in the model image, that the feature point corresponding to the model feature point exists in the input image when the feature point in which the luminance gradient direction falls within a directional-misalignment allowable range exists in the input image corresponding to a positional-misalignment allowable range of the model feature point.

Accordingly, the allowance of the deformation can more finely be set than ever before in the image comparison of the variable-shape object. The allowances of the positional misalignment and directional misalignment are separately set according to how the comparison object is easily deformed, which allows the comparison of the variable-shape object to be more accurately performed than ever before.

The allowable range of the position of the feature point may have one of rectangular, circular, and elliptic shapes centering around the position of the feature point in the model image. Any shape may be set to the allowable range, but the allowable range determining processing is facilitated when the allowable range of the position of the feature point is set to the rectangular shape (a square or an oblong). When the allowable range is set to the circle, the positional misalignment is equally allowable in any direction. When the allowable range is set to the ellipse or the oblong, the large misalignment of the position is allowable in a specific direction. Alternatively, the allowable range of the position may have any shape, but the center of the shape needs not to be the position of the feature point of the model image.

The allowable range of the luminance gradient direction may fall within a predetermined angle range centering around the luminance gradient direction in the model image.

Alternatively, the luminance gradient direction in the model image is not set to the center, but different angle misalignments may be allowable in a clockwise direction and a counterclockwise direction.

Any point can be used as the feature point of the present invention as long as the point is obtained as a characteristic point from the image. For example, an edge point can be used as the feature point of the present invention. Other feature points such as SIFT, SURF, and Harris corner point can also be adopted as the feature point of the present invention.

The image comparison device may further include an allowable range setting unit configured to cause a user to set the allowable range of the position of the feature point and the allowable range of the luminance gradient direction at the position of the feature point in the image comparison.

The allowable range setting unit can be configured such that the user can set one or both of the allowable ranges of the position of the feature point and the luminance gradient direction. In this case, the user may set a specific numerical value or an allowable level. The user can perform the finer setting by setting each of the allowable ranges of the position of the feature point and the luminance gradient direction.

The allowable range setting unit may previously store a combination of an allowable deformation pattern and an allowable deformation amount level and a combination of the allowable range of the position of the feature point and the allowable range of the luminance gradient direction at the position of the feature point while the correlating the combination to each other, receive the allowable deformation pattern and the allowable deformation amount level from the user, and decide the allowable range of the position of the feature point and the allowable range of the luminance gradient direction at the position of the feature point based on input from the user. Therefore, the user can more easily understand the setting contents.

The image comparison device may further include: a corresponding point storage unit in which the position of the feature point in the input image is stored while associated with the model feature point, the position of the feature point being detected with the image comparison unit and corresponding to the model feature point; and an output unit configured to output the position of the feature point in the input image, the position of the feature point corresponding to the model feature point stored in the corresponding point storage unit. An output destination of the output unit may be an output device such as a display or a control device that controls another machine. The output of the position of the feature point corresponding to the model feature point in the input image can properly recognize the shape change of the comparison object.

The corresponding feature point position is not necessarily output with respect to all the model feature points. A setting unit configured to receive which feature point corresponding to the model feature point is output in the input image from the user may be provided to output the position of the feature point corresponding only to the model feature point specified by the user.

The present invention can also be recognized as an image comparison device including at least a part of the above configuration. The present invention can also be recognized as an image sensor including a camera configured to photograph an object and the image comparison device. The present invention can also be recognized as a processing system that controls the image sensor and a comparison object configured to perform an operation on a comparison object. For example, when the image sensor outputs the position of the feature point corresponding to model feature point in the input image, the control device controls the processing device such that the operation is performed on a region, the region being decided based on the position of the feature point, which allows the proper operation to be performed in consideration of the shape change of the comparison object.

The present invention can also be recognized as a method for controlling the image comparison device including at least a part of the above configuration, a computer program that causes a computer to execute the method, or a computer-readable recording medium in which the program is non-transiently stored. The above configurations and the pieces of processing can be combined to construct the present invention unless technical inconsistency is generated.

Effect of the Invention

Accordingly, the present invention can provide the technology of being able to finely specify the allowable shape change to compare the variable-shape objects.

BRIEF DESCRIPTION OF THE DRAWINGS

FIG. 7($a$) illustrates a model image, FIG. 7($b$) illustrates an input image, and FIG. 7($c$) illustrates a comparison between the model image and the input image.

FIGS. 8($a$) to 8($d$) are views illustrating comparison scores when the allowable amount for the positional misalignment and the allowable amount for the directional misalignment are changed with respect to various deformations. FIG. 8($a$) illustrates the model image, FIG. 8($b$) illustrates the comparison result with respect to a narrowed deformation, FIG. 8($c$) illustrates the comparison result for a cracked deformation, and FIG. 8($d$) illustrates the comparison result with respect to another deformation.

FIGS. 9($a$) and 9($b$) are views illustrating examples of setting screens of the allowable amounts for the positional misalignment and directional misalignment, respectively.

MODES FOR CARRYING OUT THE INVENTION

The present invention relates to a technology of detecting a predetermined object from an image photographed with a camera. The technology is applicable to object detection in an FA image sensor, a computer vision, machine vision, and the like. In the following embodiments, an example in which the present invention is implemented in the FA image sensor that detects the workpiece of the variable-shape object flowing in the line will be described below as one of preferable applications.

First Embodiment (Image Sensor)

An entire configuration and a use situation of an image sensor according to an embodiment of the present invention will be described with reference to FIG. 1.

An image sensor 1 is a system that is installed in a production line to detect a position of a product (workpiece 2) using an input image obtained by imaging of the workpiece 2. In addition to the position detection, various image processing functions such as edge detection, flaw and stain detection, and area, length, and centroid measurement can be implemented in the image sensor 1 as needed.

Figure 1:
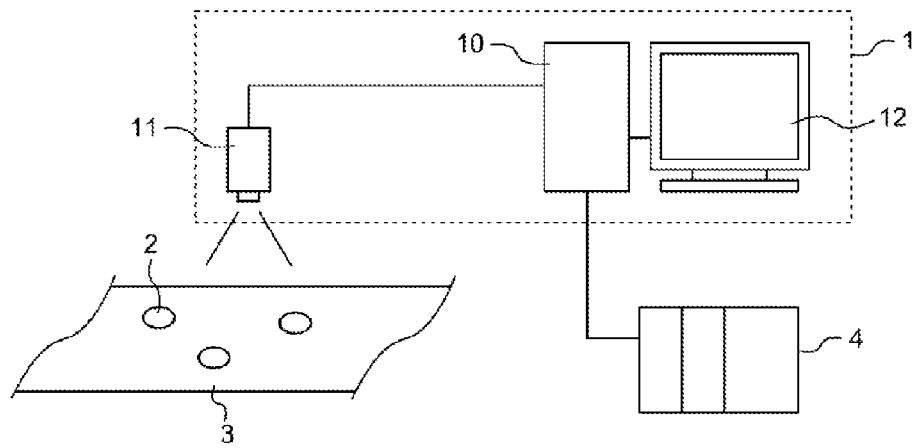
FIG. 1 is a view illustrating an entire configuration of an image sensor according to an embodiment.

As illustrated in FIG. 1, the workpieces 2 flow on a conveyer 3. The workpiece 2 is the object (variable-shape object), the shape of which changes according to the situation even in the identical individual or varies among individuals. The image sensor 1 periodically captures the image from a camera 11, performs processing of detecting the position of each workpiece 2 included in the image using an image processing device 10, and displays or outputs a processing result on a display 12 or to an external device (such as a PLC 4). The PLC (Programmable Logic Controller) 4 controls the image sensor 1, the conveyer 3, and a production apparatus (not illustrated) such as a robot.

(Hardware Configuration of Image Sensor)

A hardware configuration of an image sensor 1 will be described below with reference to FIG. 2. The image sensor 1 is schematically constructed with the camera 11 and the image processing device 10.

The camera 11 is a device that captures the image of the workpiece 2 in the image processing device 10. For example, a CMOS (Complementary Metal-Oxide-Semiconductor) camera and a CCD (Charge-Coupled Device) camera can suitably be used as the camera 11. Any format (such as resolution, color/monochrome, a still image/video, a gray scale, and a data format) may be used with respect to the input image, and properly be selected according to a kind of the workpiece 2 and a purpose of sensing. In the case that a special image (such as an X-ray image and a thermographic image) except for a visible-light image is adopted in an inspection, the camera may be used according to the special image.

The image processing device 10 includes a CPU (Central Processing Unit) 110, a main memory 112 and a hard disk 114 as a storage, a camera interface 116, an input interface 118, a display controller 120, a PLC interface 122, a communication interface 124, and a data reader/writer 126. These units are connected to one another through a bus 128 such that data communication can be conducted.

The camera interface 116 mediates data transmission between the CPU 110 and the camera 11, and includes an image buffer 116a in which image data from the camera 11 is temporarily accumulated. The input interface 118 mediates the data transfer between the CPU 110 and input units (such as a mouse 13, a keyboard, a touch panel, and a jog controller). The display controller 120 is connected to a display 12 such as a liquid crystal monitor, and controls the display 12. The PLC interface 122 mediates the data transfer between the CPU 110 and the PLC 4. The communication interface 124 mediates the data transfer between the CPU 110 and a console (or a personal computer or a server device) and the like. The data reader/writer 126 mediates the data transfer between the CPU 110 and a memory card 14 that is of a storage medium.

The image processing device 10 can be constructed with a computer having a general-purpose architecture, and the CPU 110 reads and executes a program (command code) stored in the hard disk 114 or memory card 14, thereby providing various functions. The program is distributed while non-transiently stored in a computer-readable recording medium such as the memory card 14 and an optical disk.

In the case that a general-purpose personal computer is used as the image processing device 10, an OS (Operation System) may be installed to provide a basic function of the computer in addition to the application program providing an object determination function described in the first embodiment. In such cases, the program of the first embodiment may implement the target function using a program module provided by the OS. The program of the first embodiment may be provided as a single application program or a module partially incorporated in another program. A part or whole of the function may be replaced with a dedicated logic circuit.

(Functional Configuration of Image Processing Device)

Figure 3:
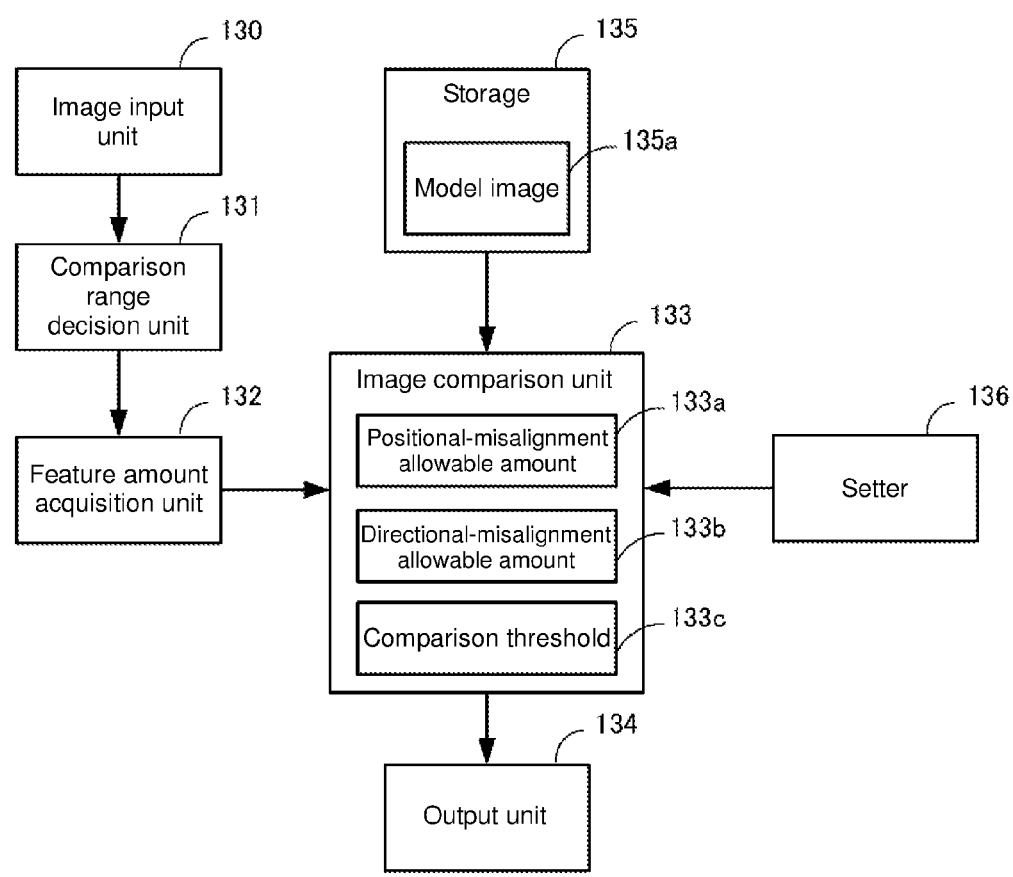
FIG. 3 is a view illustrating a functional configuration associated with image comparison of an image processing device according to a first embodiment.

The image processing device 10 has a function of detecting the detection object from the input image using the template matching technology. FIG. 3 illustrates a functional configuration associated with the object detection (position detection) provided by the image processing device. The image processing device 10 includes an image input unit 130, a comparison range decision unit 131, a feature amount acquisition unit 132, an image comparison unit 133, an output unit 134, a storage 135, and a setter 136 as the function associated with the object detection. The CPU 110 of the image processing device 10 executes the computer program to implement these functional blocks.

The image input unit 130 is a functional unit that acquires the image of the workpiece photographed with the camera 11. The comparison range decision unit 131 is a functional unit that decides a range (comparison range) where the comparison is performed to the model image. It is assumed that a size of the comparison range is equal to that of the model image, and the comparison range decision unit 131 decides the position of the comparison range. The position of the comparison range may sequentially be changed by scanning of the input image, or decided as a position where the object is likely to exist by performing the simple object detection processing.

The feature amount acquisition unit 132 is a functional unit that acquires the position of the feature point and a luminance gradient direction at the feature point position from the input image. In the first embodiment, the edge point is adopted as the feature point. Any existing technique may be adopted as an edge point acquisition method. For example, a differential filter such as a Sobel filter is applied to the input image to obtain a luminance gradient vector (luminance gradient direction), and a point where the gradient vector is maximized in a luminance gradient direction can be extracted as the edge point. Preferably fine line processing is performed before and after the edge detection.

The image comparison unit 133 performs the comparison between the input image comparison decided with the input image comparison range decision unit 131 and a model image 135a stored in the storage 135, and determines whether the comparison object exists in the comparison range. Although described in detail later, the image comparison unit 133 performs comparison processing while a predetermined allowable range is provided with respect to each of the positional misalignment of the feature point and the directional misalignment of the luminance gradient. In order to perform the comparison processing, the image comparison unit 133 holds a positional-misalignment allowable amount 133a, a directional-misalignment allowable amount 133b, and a comparison threshold (determination threshold) 133c as comparison parameters.

The output unit 134 outputs a comparison result of the image comparison unit 133. For example, the position of the input image in which the image comparison unit 133 detects the comparison object is output in the form of highlighting in the image or a numerical value.

Figure 5:
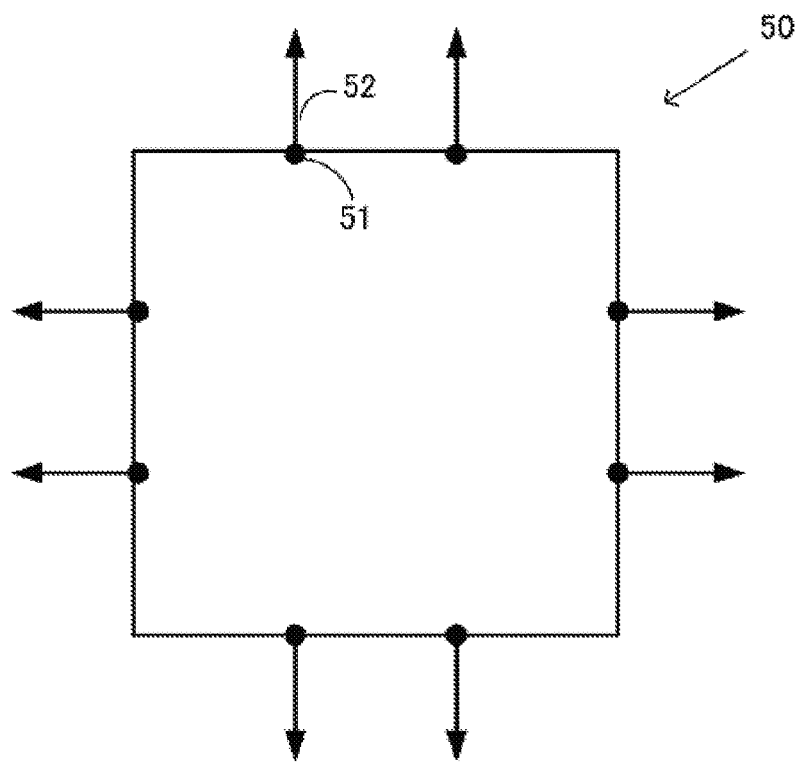
FIG. 5 is a view illustrating an example of a model image.

Information (referred to as a model image) about the comparison object is stored in the storage 135. FIG. 5 illustrates an example of the model image 135a stored in the storage 135. The model image 135a includes a position 51 of the edge point (feature point) of the comparison object 50 and a luminance gradient direction 52 of at the position 51 of the edge point. Although eight edge points are illustrated in FIG. 5, any number of edge points may be provided, and several tens to several hundreds or more of edge points may be provided.

The setter 136 is a functional unit that enables a user to set the positional-misalignment allowable amount 133a, the positional-misalignment allowable amount 133b, and the comparison threshold 133c, which are of the comparison parameters used in the comparison performed with the image comparison unit 133. A parameter setting method is described in detail later.

(Image Comparison Processing)

In image comparison processing of the first embodiment, whether the feature point corresponding to the feature point (model feature point) included in the model image exists in the input image is determined while misalignment is allowable with respect to the feature point position and the luminance gradient direction. Specifically, the determination that the feature point corresponding to the model feature point exists in the input image is made when the feature point in which the luminance gradient direction falls within the directional-misalignment allowable range exists in the input image corresponding to the positional-misalignment allowable range of the model feature point.

The image comparison processing performed with the image processing device 10 of the first embodiment will be described in detail below with reference to a flowchart in FIG. 4.

The image processing device 10 acquires the image photographed with the camera 11 through the image input unit 130 (S10). Hereinafter the image is referred to as an input image. The feature amount acquisition unit 132 acquires the edge point and the luminance gradient direction at each edge point from the input image (S12).

The comparison range decision unit 131 decides the range (comparison range) of the comparison to the model image from the input image (S14). The comparison range may be set to the position where the input image is sequentially scanned. Alternatively, the comparison range may be set to the position where the detection object is likely to exist by performing the simple object detection processing. The pieces of processing in Steps S14 to S26 are performed on each comparison region.

After a comparison score is reset to zero (S16), the image comparison unit 133 checks whether the corresponding edge point exists in the comparison range of the input image with respect to each edge point of the model image (S18). The comparison score is incremented by 1 when the corresponding edge point exists in the input image. When the corresponding edge point does not exist in the input image, the image comparison unit 133 checks the next edge point. In the first embodiment, an integer in which the maximum value is the number of edge points in the model image is adopted as the comparison score. Alternatively, a value normalized with a predetermined value (for example, 100) as the maximum value may be used as the comparison score.

In the image comparison processing, the positional misalignment of the edge point and the directional misalignment of the luminance gradient are allowable in determining whether the corresponding edge point exists. The comparison parameter specifying the allowable amount includes the positional-misalignment allowable amount 133a and the directional-misalignment allowable amount 133b.

Figure 6:
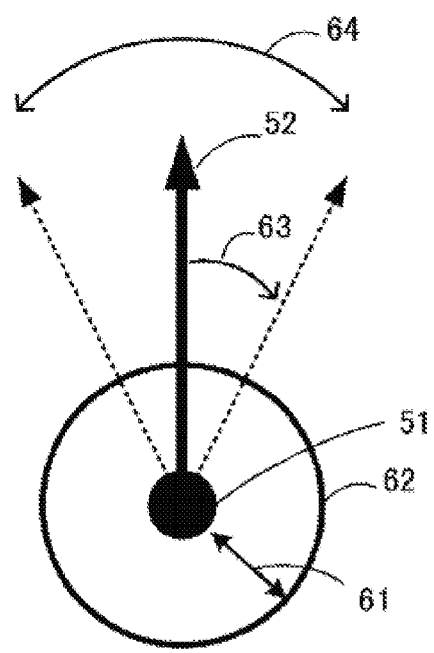
FIG. 6 is a view illustrating a positional-misalignment allowable range of a feature point and a directional-misalignment allowable range in a luminance gradient direction.

FIG. 6 is a view illustrating the positional-misalignment allowable amount 133a and the directional-misalignment allowable amount 133b. In the first embodiment, the positional-misalignment allowable amount 133a is specified as a distance 61 from the edge point 51 in the model image. At this point, a circle 62 having a predetermined radius 61 with the position of the edge point 51 in the model image as the center constitutes the positional-misalignment allowable range. The directional-misalignment allowable amount 133b is specified as an angle 63 with the luminance gradient direction 52 at the edge point 51 in the model image. That is, a range 64 within the angle 63 centering around the luminance gradient direction in the model image constitutes the directional-misalignment allowable range.

Figure 7:
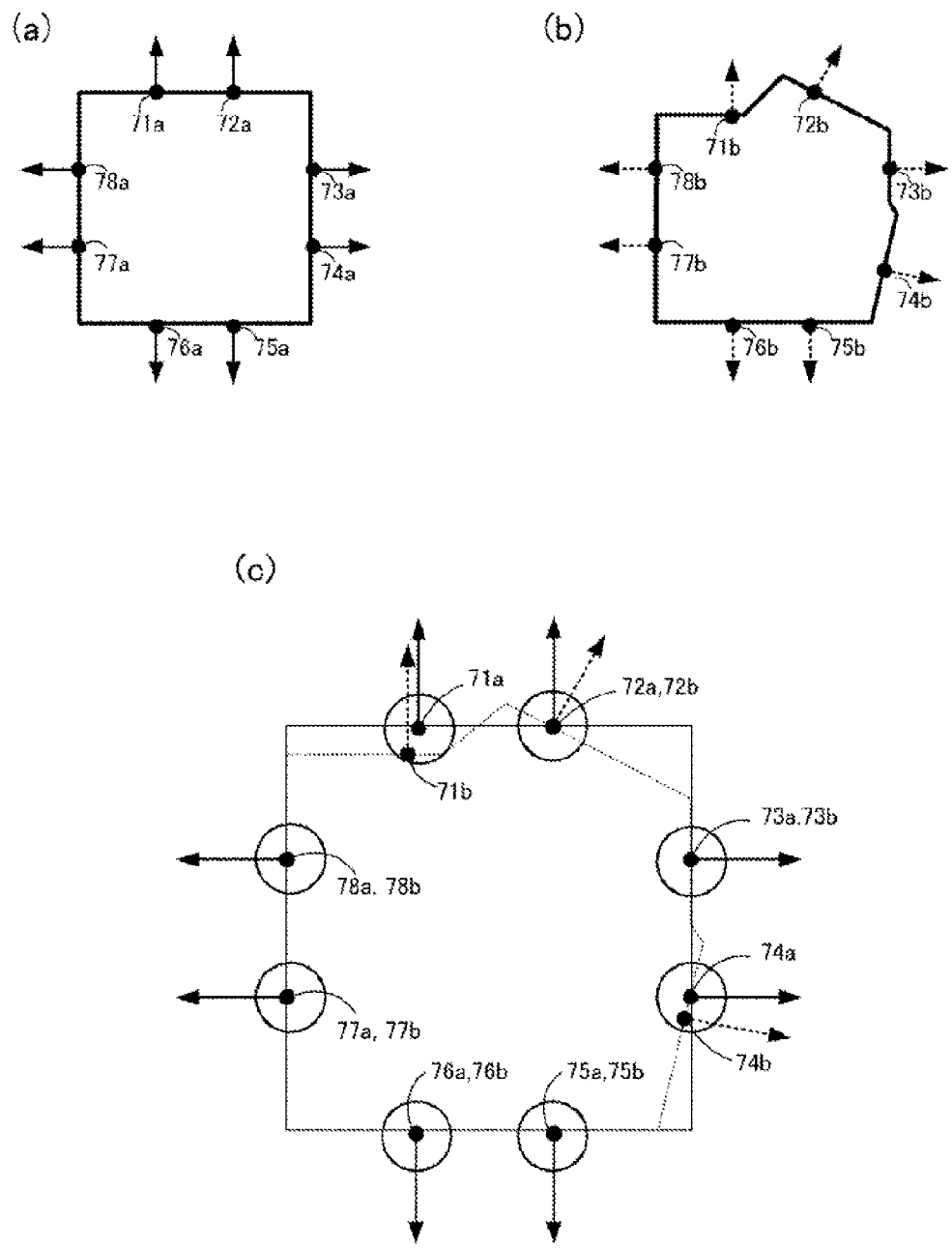
FIGS. 7($a$) to 7($c$) are views illustrating comparison processing of an image comparison unit.

The processing in Step S18 will be described with reference to FIG. 7. FIG. 7(a) illustrates the model image. Similarly to FIG. 5, the model image in FIG. 7(a) is constructed with eight edge points 71a to 78a and the luminance gradient direction at each edge point. FIG. 7(b) illustrates edge points 71b to 78b of the input image acquired with the feature amount acquisition unit 132 and the luminance gradient direction at each edge point.

In Step S18, the image comparison unit 133 checks whether the edge point corresponding to the edge point of the model image exists in the input image. At this point, the positional misalignment specified by the positional-misalignment allowable amount 133a and the directional misalignment in the luminance gradient direction at the edge point specified by the directional-misalignment allowable amount 133b are allowable. Specifically, the edge point corresponding to the edge point of the model image exists in the input image when, in the input image, the edge point in which the luminance gradient direction falls within the directional-misalignment allowable amount 133b exists in the range of the positional-misalignment allowable amount 133a from an edge point position of the model image.

The description will be made with reference to FIG. 7(c). FIG. 7(c) is a view illustrating the model image in FIG. 7(a) and the input image in FIG. 7(b) while the model image and the input image overlap each other. At this point, the positional-misalignment allowable ranges around the edge points 71a to 78a of the model image are indicated by circles. The directional-misalignment allowable range in the luminance gradient direction is omitted in FIG. 7(c).

For the five edge points 73a and 75a to 78a, because the edge points 73b and 75b to 78b having the identical luminance gradient direction exist in the identical position of the input image, the determination that the edge point corresponding to each edge point exists in the input image is made. For the edge point 71a, because the edge point 71b having the identical luminance gradient direction exists in not the completely identical position but the positional-misalignment allowable range, the determination that the corresponding edge point exists in the input image is made. For the edge point 72a, because the edge point 72b having the luminance gradient direction exists in not the identical direction but the directional-misalignment allowable range, the determination that the corresponding edge point exists in the input image is made. For the edge point 74a, because the edge point 74b having the luminance gradient direction exists in not the identical position but the positional-misalignment allowable range and in not the identical direction but the directional-misalignment allowable range, the determination that corresponding edge point exists in the input image is made.

After repeatedly performing the pieces of processing in Steps S18 to S20 on all the edge points in the model image described above, the image processing device 10 determines whether the obtained comparison score is greater than or equal to a predetermined comparison threshold (S22).

When the comparison score is greater than or equal to the predetermined comparison threshold, the image comparison unit 133 determines that the comparison object exists in a search range of the input image (S24). On the other hand, when the comparison score is less than the comparison threshold, the image comparison unit 133 determines that the comparison object does not exist in the search range of the input image (S26).

The image processing device 10 repeatedly performs the pieces of processing in Steps S14 to S26 while changing a comparison region, and the image processing device 10 outputs a comparison result after performing the comparison processing on the whole comparison region. The comparison result may be transmitted to and displayed on the output unit 134, or used as input for another piece of processing (such as inspection processing) in the image processing device 10. The comparison result is not output after the comparison processing is performed on the whole comparison range, the comparison result may be output every time the processing is performed on one comparison range or the object is detected.

(Comparison Result)

The effect of the comparison processing (template matching) in which the positional misalignment of the edge point and the directional misalignment of the luminance gradient are allowable will be described below with reference to FIG. 8. FIG. 8(a) illustrates an example of the model image expressing a comparison object, which is a T-shape comparison object herein.

FIGS. 8(b) to 8(d) illustrate input images in deformation of the comparison object and a comparison score in each setting. "Position 0, direction 0", "position 0, direction 3", and "position 3, direction 0" in FIGS. 8(b) to 8(d) express how much the positional misalignment and the directional misalignment are allowable. At this point, each misalignment allowable amount is set to six levels of 0 to 5, and the level of 0 indicates that the misalignment is not allowable while the level of 5 indicates that the misalignment is maximally allowable. FIGS. 8(b) to 8(d) also illustrate the comparison score of a result of the image comparison performed with each comparison parameter. The comparison score is normalized such that the maximum value becomes 100.

FIG. 8(b) illustrates the input image in the case that the deformation is generated with a width narrowed. In the deformation in which the width of the object is narrowed or widened, the luminance gradient direction does not change at the edge point, but the edge point position changes. Accordingly, the comparison score increases in the setting of "position 3, direction 0" in which the positional-misalignment allowable amount is increased. That is, the object can correctly be detected even if the narrow or widened deformation is generated.

FIG. 8(c) illustrates the input image in the case that a crack is generated in an originally straight portion. In the deformation in which the crack is generated, the edge point position does not change too much, but the luminance gradient direction changes at the edge point. Accordingly, the comparison score increases in the setting of "position 1, direction 4" in which the small positional misalignment and the relatively-large directional misalignment are allowable. That is, the object can correctly be detected even if the crack is generated.

FIG. 8(d) illustrates the input image in the case that the object shape is deformed. Both the edge point position and the luminance gradient direction at the edge point change in the deformation in which the object shape is deformed. Accordingly, the comparison score increases in the setting of "position 2, direction 3" in which both the positional misalignment and the directional misalignment are relatively largely allowable. That is, the object can correctly be detected even if the deformation is generated.

The comparison score increases when the positional-misalignment and directional-misalignment allowable amounts increase, so that a probability of overlooking the object to be detected (false negative) can be decreased. However, the probability of the false detection (false positive) is increased when the allowable amount is increased at random. The settings of the positional-misalignment and directional-misalignment allowable amounts according to a deformation behavior of the detection object can properly detect the detection object while minimizing a possibility of the false detection. That is, the directional misalignment of the luminance gradient direction is allowable in addition to the positional misalignment of the feature point, so that the allowable shape change can more finely be specified than ever before.

(Comparison Parameter Setting Method)

A method for setting the comparison parameter such as the misalignment at the feature point position and the misalignment in the luminance gradient direction at the feature point position will be described below. The setter (allowable range setting means) 136 displays a setting user interface on the display 12, and the user inputs the comparison parameter with the mouse 13 and the like.

FIG. 9(a) illustrates an example of a comparison parameter setting user interface. In the example of FIG. 9(a), the user numerically inputs the positional-misalignment allowable amount, the directional-misalignment allowable amount, and the determination threshold (comparison threshold). The positional-misalignment allowable amount may be specified as an absolute value in units of pixels, or a relative value for a size (for example, a horizontal size) of the model image. The directional-misalignment allowable amount is specified in terms of degree. The determination threshold is specified as a numerical value (in this case, 0 to 100) between the minimum value and the maximum value of the comparison score.

Preferably the image expressing the positional-misalignment and directional-misalignment allowable ranges is displayed according to the input numerical value. The image is updated when the numerical value is updated, whereby the allowable amount is easily and visually understood. The comparison parameters such as the positional-misalignment allowable range and the directional-misalignment allowable range may be input by changing the positional-misalignment allowable range or the directional-misalignment allowable range.

Thus, the user can correctly specify the setting associated with the comparison by enabling the input of the specific numerical value.

FIG. 9(b) illustrates another example of the comparison parameter setting user interface. In the example of FIG. 9(b), the specific numerical value is not input unlike FIG. 9(a), but a level indicating magnitude of an allowable error is input. In the example of FIG. 9(b), each of the positional-misalignment allowable amount, the directional-misalignment allowable amount, and the determination threshold can be specified at 11 levels of 0 to 10. Each level and a specific parameter value may previously and internally be decided. For example, the parameter value may be increased at equal intervals according to the increase in level such that the positional-misalignment allowable amount is incremented by 3 pixels at each level, and such that the directional-misalignment allowable amount is incremented by 10 degrees in each level. The parameter value may be increased at not equal intervals but unequal intervals according to the increase in level. Any number of settable levels may be provided in addition to the 11 levels in FIG. 9(b), and the number of settable levels may vary according to the comparison parameter.

Desirably a correspondence between the input level and the specific parameter value is changed according to the comparison object. In this case, the correspondence is previously prepared according to a kind of the comparison object, and the user is caused to input the kind of the comparison object or the kind of the comparison object is acquired by image recognition, whereby which correspondence is selected to decide the parameter value.

Thus, the user easily and intuitively understands the setting associated with the comparison in the input form of the allowable level.

FIG. 10(a) illustrates still another example of the comparison parameter setting user interface. In FIGS. 9(a) and 9(b), the user independently sets the positional-misalignment and directional-misalignment allowable amounts. On the other hand, in the example of FIG. 10(a), the user sets the allowable deformation pattern and the allowable level. Three patterns of "narrowed/widened", "crack", and "others" are prepared as the allowable deformation pattern.

The user selects one of the three allowable deformation patterns, and specifies the allowable level expressing how much a deformation amount is allowable. A combination of the deformation pattern and the allowable level and the actually-set comparison parameter may be stored while previously correlated with each other. FIG. 10(b) illustrates a table in which the correspondence between the combination of the deformation pattern and the allowable level and the combination of the positional-misalignment and directional-misalignment allowable amounts is defined. The table is not stored, but a calculation formula (function) may be stored every deformation pattern in order to calculate the allowable amount from the allowable level.

"Narrowed/widened" assumes the deformation in which the width of the object changes, namely, the deformation in which the luminance gradient direction does not change but the feature point position changes. Accordingly, the positional-misalignment allowable amount is set larger as the allowable level of the deformation amount increases. "Crack" assumes the deformation in which a linear boundary becomes jagged, namely, the deformation in which the feature point position changes slightly while the luminance gradient direction changes relatively largely. Accordingly, the directional-misalignment allowable amount is set larger as the allowable level of the deformation amount increases. "Others" assumes any deformation except for "narrowed/widened" and "crack". Accordingly, the positional-misalignment and directional-misalignment allowable amounts are set larger as the allowable level of the deformation amount increases.

Figure 10:
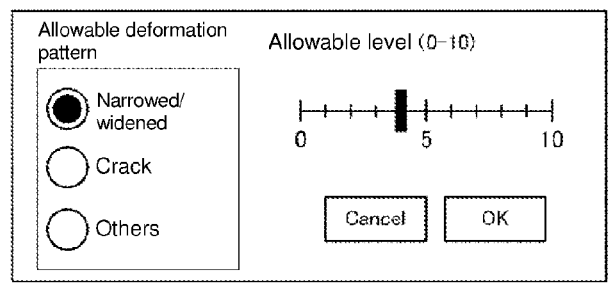
FIG. 10($a$) is a view illustrating an example of the setting screen of the allowable amounts for the positional misalignment and directional misalignment, and FIG. 10($b$) is a view illustrating an example of a table in which a correspondence among a deformation pattern, an allowable level, and the allowable amounts for the positional misalignment and directional misalignment is stored.

The numerical values in the first embodiment are illustrated only by way of example, and the numerical values corresponding to the specific comparison parameter may properly be decided. The allowable deformation pattern is not limited to the above three kinds, but the number of allowable deformation patterns may be increased or decreased. In the example of FIG. 10, the user sets both the positional-misalignment and directional-misalignment allowable amounts. Alternatively, the user may set one of the positional-misalignment and directional-misalignment allowable amounts. The setting of the determination threshold is omitted in the example of FIG. 10. Alternatively, the determination threshold may separately be settable, or the determination threshold may automatically be changed according to the allowable level.

As described above, the user easily and intuitively understands the setting associated with the comparison by setting the allowable deformation pattern and the level of the allowable amount.

Second Embodiment

Figure 12:
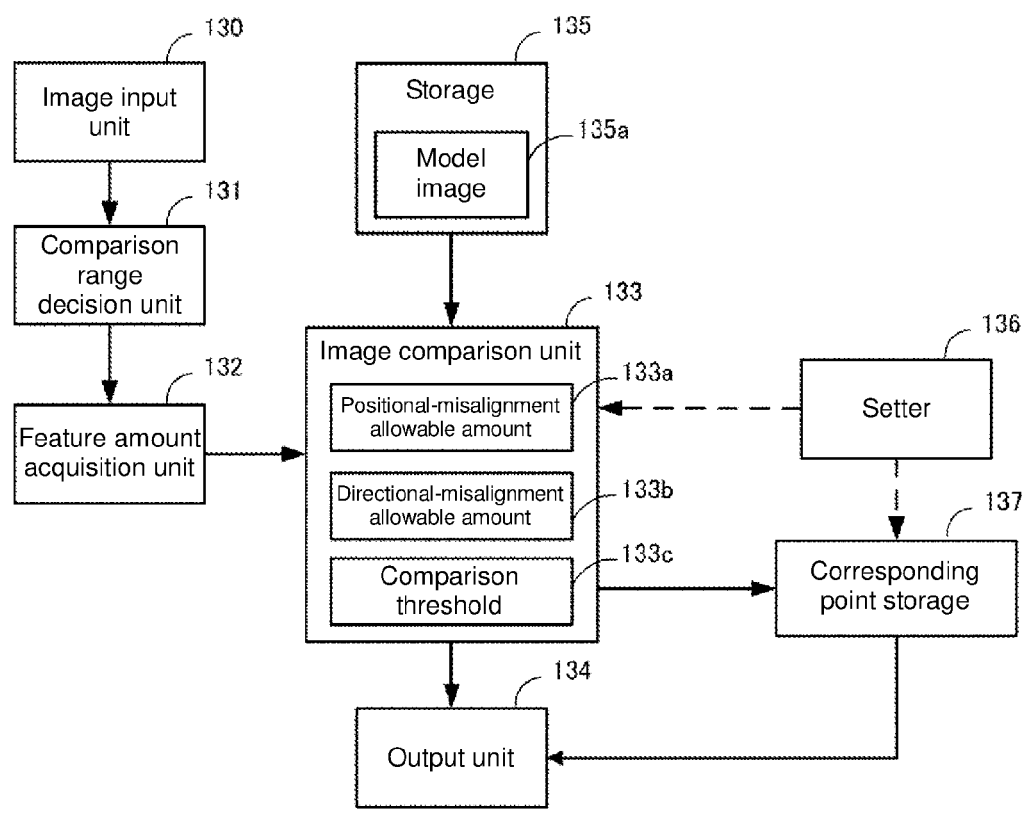
FIG. 12 is a view illustrating a functional configuration associated with image comparison of an image processing device according to a second embodiment.

In a second embodiment, the position of the input-image feature point that coincides with the model-image feature point is stored, which allows recognition of the shape change of the comparison object. Because an image sensor of the second embodiment has a configuration basically similar to the image sensor of the first embodiment, a different portion will mainly be described below. FIG. 12 is a functional block diagram illustrating an image processing device 20 of the image sensor 1 of the second embodiment. The image processing device 20 differs from the image processing device 10 of the first embodiment in that a corresponding point storage 137 is provided.

Figure 4:
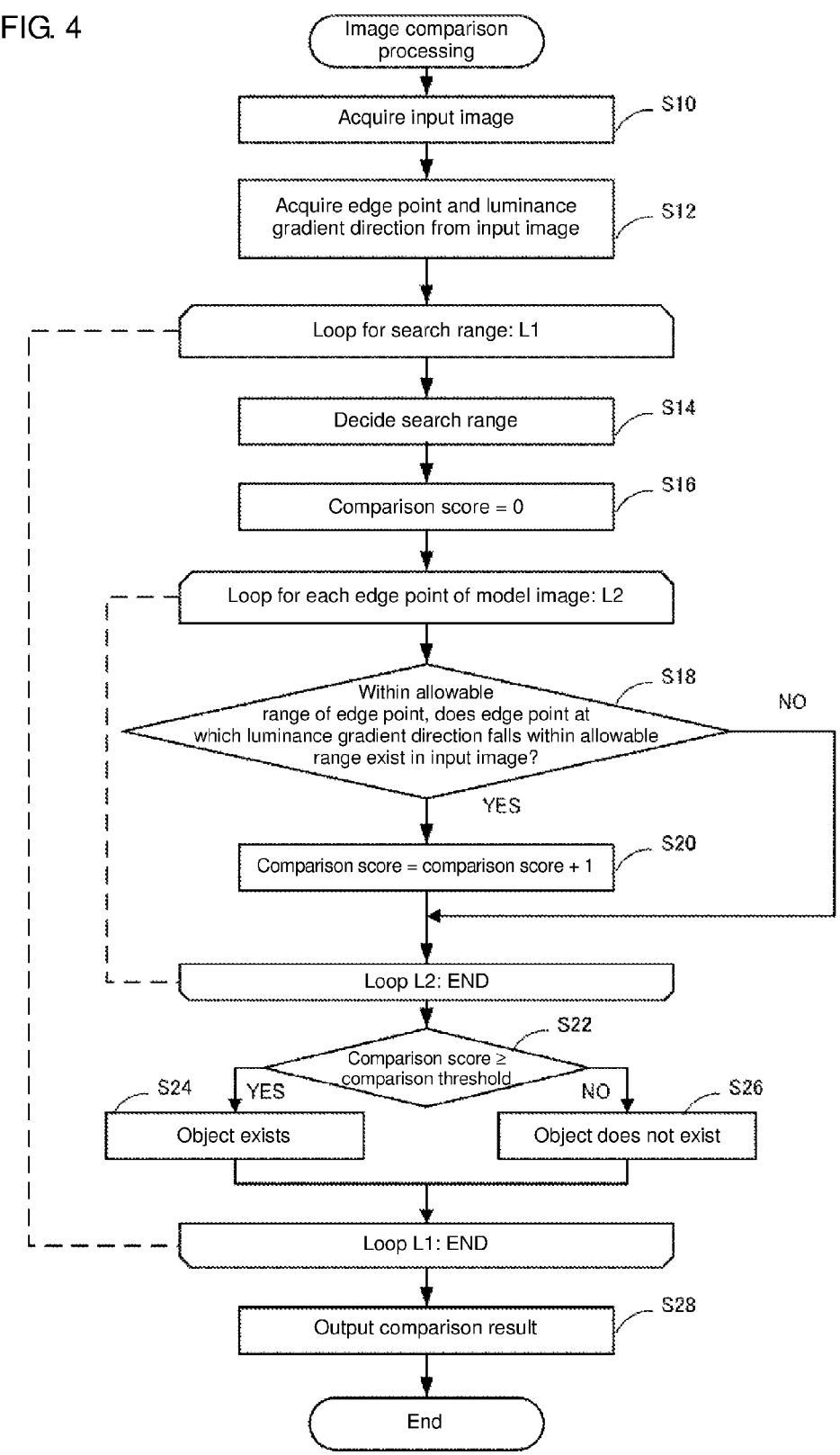
FIG. 4 is a flowchart illustrating a flow of image comparison processing.

The image comparison unit 133 obtains the input-image feature point corresponding to the model image feature point (Step S18 in the flowchart of FIG. 4). At this point, the image comparison unit 133 stores the position of the input-image feature point corresponding to the model-image feature point in the corresponding point storage 137. The position of the corresponding input-image feature point may be stored with respect to all the model-image feature points, or only the feature point in which the corresponding point is output may be stored as described later.

In outputting the detection position of the comparison object (workpiece) as the comparison result, the output unit 134 outputs the position of the input-image feature point corresponding to the model-image feature point, the position of the input-image feature point being stored in the corresponding point storage 137. The output destination may be the display 12 or an external device such as the PLC 4.

The user can specify which one of the input-image feature point positions corresponding to the model-image feature points is output from the output unit 134 through the setter 136. Any number of feature points may be set to the output target. Because the shape change can more finely be recognized as the corresponding point is more densely output, the number of feature points to be output may be decided according to necessary recognition accuracy of the shape change.

The image sensor 1 of the second embodiment can properly recognize the shape change of the workpiece. Particularly, in the case that the input-image feature point positions corresponding to the model-image feature points is output to the PLC 4, the PLC 4 can recognize the shape change of the workpiece and perform the operation on a specific position (region) of the workpiece. A processing system with the image sensor of the second embodiment will be described below.

Figure 2:
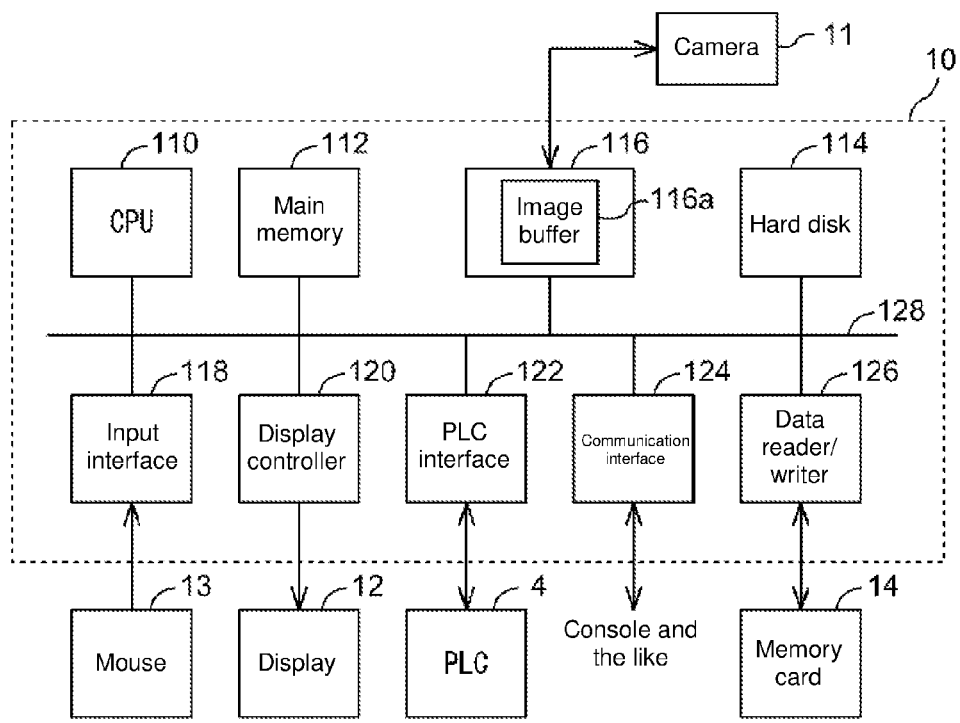
FIG. 2 is a view illustrating a hardware configuration of the image sensor according to the embodiment.

For example, the image sensor 1 of the second embodiment can suitably be used in the case that the PLC 4 controls a vegetable processor in a processing system constructed with the system in FIGS. 1 and 2 and the vegetable processor. It is assumed that the processor cuts a calyx of a vegetable (for example, an eggplant). It is necessary to identify the position of the calyx to be cut because of a large individual difference. Therefore, the position of the feature point is previously decided in order to identify the calyx region in the model image, and the input-image feature point corresponding to the feature point may be output from the image sensor 1 to the PLC 4. Based on the feature point position obtained from the image sensor 1, the PLC 4 can identify the calyx region and issue an instruction to the processor to cut the calyx region.

The image sensor 1 of the second embodiment can also suitably be used in the case that the PLC 4 controls a carrying machine in a system constructed with the system in FIGS. 1 and 2 and the carrying machine that moves the workpiece while grasping (picking up) the workpiece from a conveyer. Preferably the grasping position is identified in the case that the carrying machine moves the workpiece while grasping the workpiece. Therefore, the position of the feature point is previously decided in order to identify the grasping region in the model image, and the input-image feature point corresponding to the feature point may be output from the image sensor 1 to the PLC 4. Based on the feature point position obtained from the image sensor 1, the PLC 4 can identify the grasping region and issue the instruction to the carrying machine to grasp and move the grasping region of the workpiece.

The above description is made only by way of example, and the image sensor of the second embodiment can suitably be used in the case that the control device performs the operation on the processing device based on the feature point position output from the image sensor in a general processing system constructed with the processing device that performs the operation on the workpiece, the image sensor, and the control device that controls the processing device.

The processing system properly recognizes the shape change of the workpiece by the output from the image sensor and issues the instruction to process the workpiece in consideration of the shape change, so that the operation can surely be performed on the workpiece.

(Modifications)

The configurations of the above embodiments are made only by way of example, but the scope of the present invention is not limited to the embodiments. Various specific configurations can be made without departing from the technical thought of the present invention.

The system that detects the position of the workpiece in the production line is described above as an example. However, the image comparison of the present invention can be applied to any use for the detection of the comparison object from the image. For example, one embodiment of the present invention can be mounted as a system that recognizes a handwritten character. One embodiment of the present invention can also be mounted as a system that acquires image data through a recording medium or a network to perform the image comparison aimed at the image data.

In the above description, the edge point is adopted as the feature point. Alternatively, any feature point may be adopted as long as the feature point is obtained as a characteristic point from the image. Other feature points obtained by various techniques such as SIFT, SURF, and Harris corner point can also be adopted as the feature point except for the edge point.

Figure 11:
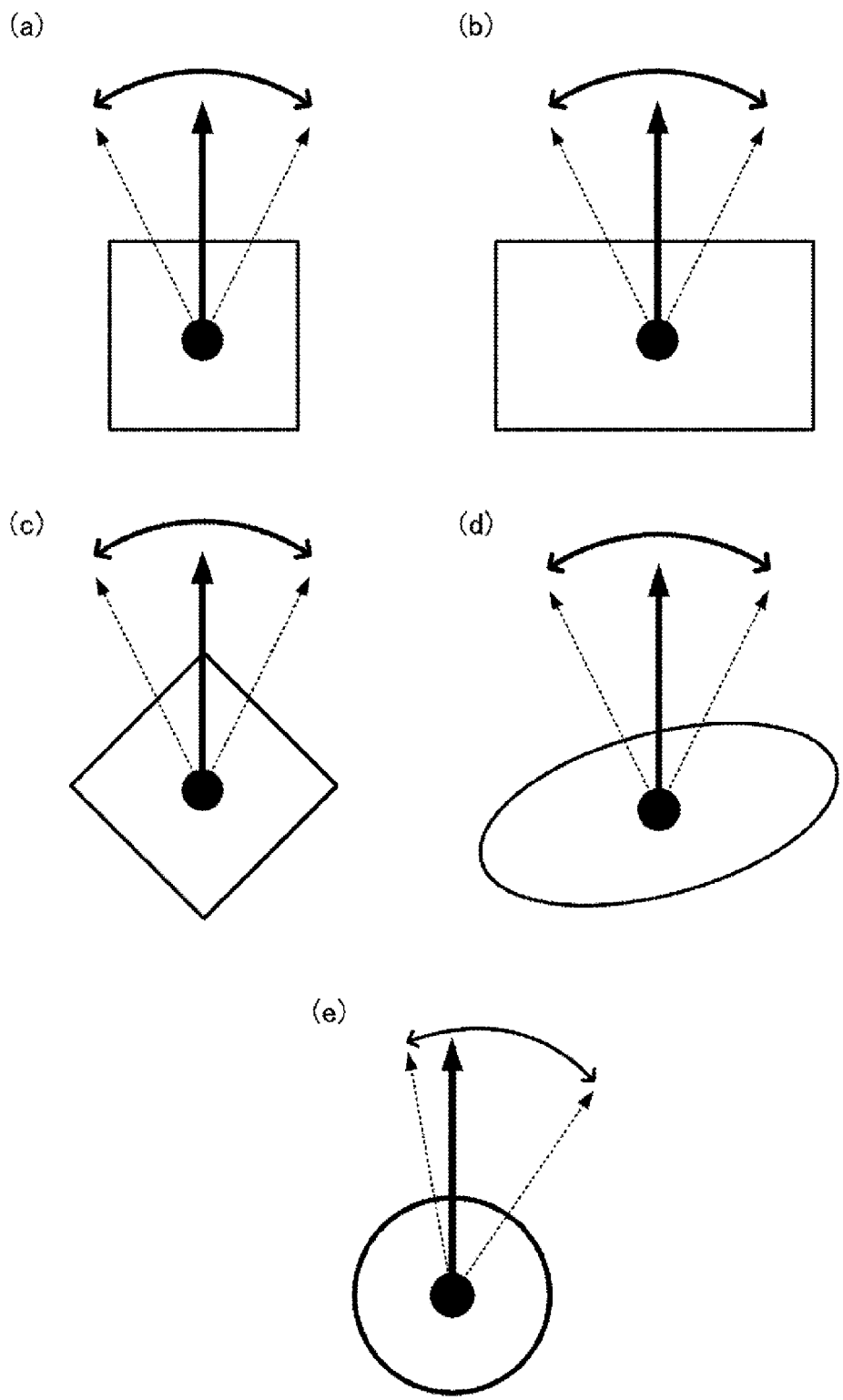
FIGS. 11($a$) to 11($e$) are views illustrating modifications of the positional misalignment allowable range and directional-misalignment allowable range.

In the above description, the positional-misalignment allowable range is set within the predetermined distance from the feature point position in the model image, namely, the circular region. Alternatively, in addition to the circular region, the allowable range can be set to the region having any shape such as a rectangular shape (a square or an oblong), an elliptic shape, and a polygonal shape. For example, as illustrated in FIG. 11(a), the positional-misalignment allowable range can be formed into a square centering around the feature point position. Therefore, the determination whether the feature point exists in the allowable range can be made based on whether each of an x-coordinate positional misalignment and a y-coordinate positional misalignment falls within a predetermined value, so that a processing load can be reduced. In FIG. 11(a), the x-coordinate positional misalignment may differ from the y-coordinate positional misalignment in the allowable amount. In this case, the positional-misalignment allowable range becomes the oblong allowable range as illustrated in FIG. 11(b), and the positional misalignment is relatively largely allowable in a specific direction. FIG. 11(c) illustrates an example in which the allowable range is formed into a rhombus. Therefore, the determination whether the feature point exists in the allowable range can be made based on whether a sum of the x-coordinate and y-coordinate positional misalignments falls within a predetermined value, so that a processing load can be reduced. The method in FIG. 11(c) can be recognized as one in which the positional misalignment within a predetermined distance is allowable while not a Euclid distance but a Manhattan distance is adopted as distance measurement. FIG. 11(d) illustrates an example in which the allowable amount is formed into an elliptic shape centering around the feature point position. Therefore, because the positional misalignment is relatively largely allowable in a specific direction, the method in FIG. 11(d) can suitably be adopted in the object in which the easy direction of the positional misalignment is fixed. Additionally, the allowable range can be formed into any shapes in addition to the shapes in FIGS. 11(a) to 11(d).

The directional-misalignment allowable range is not necessarily included in the angle range centering around the luminance gradient direction in the model image. As illustrated in FIG. 11(e), the directional-misalignment allowable amount may vary according to the direction. In this case, the misalignment allowable amount in a clockwise direction and the misalignment allowable amount in a counterclockwise direction may separately be set.

In the above description, whether the corresponding feature point exists in the input image is determined by applying the identical misalignment allowable limit to all the feature points in the model image. Alternatively, a different allowable limit may be applied in each feature point. That is, the positional-misalignment allowable amount and the directional-misalignment allowable amount may be set in each feature point.

In FIG. 1, the camera and the image processing device are separately configured in the image sensor. Alternatively, the image sensor in which the camera and the image processing device are integrally configured may be used. A plurality of cameras are connected to the image processing device, and a plurality of lines can be measured and monitored with one image sensor. A part or all of the functions of the image processing device may be performed with another computer by applying technologies such as grid computing, a client server system, and cloud computing.

DESCRIPTION OF SYMBOLS 1 image sensor
2 workpiece
3 conveyer
4 PLC
10 image processing device
11 camera
12 display
130 image input unit
131 comparison range decision unit
132 feature amount acquisition unit
133 image comparison unit
134 output unit
135 storage
136 setter

The invention claimed is:

1. An image comparison device comprising:
a memory; and
a processor coupled to the memory, wherein
a model image is stored in the memory, the model image including a position of a feature point of a comparison object and a luminance gradient direction at the position of the feature point;
the processor configured with a program to perform operations as functional units comprising:
a feature amount acquisition unit configured to acquire the position of the feature point and the luminance gradient direction at the position of the feature point from an input image; and
an image comparison unit configured to compare the model image and the input image, wherein
the image comparison unit performs image comparison of the model image and the input image in which an allowable range in both the position of the feature point and the luminance gradient direction at the position of the feature point provided.

2. The image comparison device according to claim 1, wherein
the feature point comprises a model feature point included in the model image; and
the processor is configured with the program to perform operations as the functional units such that the image comparison unit determines, with respect to the model feature point, that the model feature point exists in the input image when the feature point in which the luminance gradient direction falls within a directional-misalignment allowable range exists in the input image corresponding to a positional-misalignment allowable range of the model feature point.

3. The image comparison device according to claim 1, wherein
a shape formed by the allowable range of the position of the feature point comprises one of: a rectangular shape, a circular shape, and an elliptic shape; and
the shape formed by the allowable range of the position of the feature point is centered around the position of the feature point in the model image.

4. The image comparison device according to claim 1, wherein the allowable range of the luminance gradient direction falls within a predetermined angle range centering around the luminance gradient direction in the model image.

5. The image comparison device according to claim 1, wherein the feature point is an edge point.

6. The image comparison device according to claim 1, wherein the processor is configured with the program to perform operations as the functional units further comprising an allowable range setting unit configured to enable the allowable range of the position of the feature point and the allowable range of the luminance gradient direction to be set at the position of the feature point in the image comparison.

7. The image comparison device according to claim 6, wherein the processor is configured with the program to perform operations as the functional units such that the allowable range setting unit is configured to enable one of or both the allowable range of the position of the feature point and the allowable range of the luminance gradient direction to be set at the position of the feature point.

8. The image comparison device according to claim 6, wherein the processor is configured with the program to perform operations as the functional units such that the allowable range setting unit:
previously stores a combination of an allowable deformation pattern and an allowable deformation amount level and a combination of the allowable range of the position of the feature point and the allowable range of the luminance gradient direction at the position of the feature point while the correlating the combination to each other,
receives a user input comprising the allowable deformation pattern and the allowable deformation amount level, and
decides the allowable range of the position of the feature point and the allowable range of the luminance gradient direction at the position of the feature point based on the received user input.

9. The image comparison device according to claim 1, wherein
the feature point comprises a model feature point included in the model image; and
the processor is configured with the program to perform operations as the functional units further comprising:
a corresponding point storage unit in which the position of the feature point in the input image is stored while associated with the model feature point, the position of the feature point being detected with the image comparison unit and corresponding to the model feature point; and
an output unit configured to output the position of the feature paint in the input image, the position of the feature point corresponding to the model feature point stored in the corresponding point storage unit.

10. The image comparison device according to claim 9, wherein the processor is configured with the program to perform operations as the functional units further comprising a setting unit configured to receive which feature point corresponding to the model feature point is output in the input image from the user.

11. An image sensor comprising:
a camera configured to photograph an object; and
the image comparison device according to claim 9, wherein
the feature point comprises a model feature point included in the model image; and
the processor is configured with the program to perform operations as the functional units such that the image comparison unit is further configured to determine whether the comparison object is included in an image input from the camera, and cause the output unit to output the position of the feature point in the input image when the comparison object is included in the input image, the position of the model feature point.

12. A processing system comprising:
control device configured to control a processing device, the processing device being configured to operate on a comparison object; and
the image sensor according to claim 11, wherein
the processor is configured with the program to perform operations as the functional units such that the output unit outputs the position of the feature point in the input image to the control device, the position of the feature point corresponding to the model feature point, and
the control device controls the processing device such that an operation is performed on a region of the comparison object, the region decided based on the position of the feature point in the input image obtained from the image sensor, the position of the feature point corresponding to the model feature point.

13. An image sensor comprising:
a camera configured to photograph an object; and
the image comparison device according to claim 1, wherein the processor is configured with the program to perform operations as the functional units such that the image comparison unit is further configured to determine whether the comparison object is included in an image input from the camera and output a determination result.

14. A computer-implemented image comparison method comprising:
storing, in a memory, a model image including a position of a feature point of a comparison object and a luminance gradient direction at the position of the feature point;
acquiring, by a processor, a position of the feature point and the luminance gradient direction at the position of the feature point from an input image; and
comparing, by the processor, the model image and the input image, wherein,
comparing, by the processor, the model image and the input image comprise comparing by providing an allowable range in both the position of the feature point and the luminance gradient direction at the position of the feature point position.

15. A non-transitory computer-readable recording medium storing instructions, which, when executed by a processor, cause the processor to perform operations comprising the method according to claim 14.

* * * * *